United States Patent [19]
Adams

[11] Patent Number: 5,868,098
[45] Date of Patent: Feb. 9, 1999

[54] HAY BALE RING MOVER

[75] Inventor: Darrell W. Adams, Readyville, Tenn.

[73] Assignee: Triple H, Inc., Readyville, Tenn.

[21] Appl. No.: 10,027

[22] Filed: Jan. 21, 1998

[51] Int. Cl.⁶ ........................................ A01K 5/00
[52] U.S. Cl. ............................. 119/60; 414/24.5
[58] Field of Search ................... 414/24.5, 920; 119/60

[56] References Cited

U.S. PATENT DOCUMENTS

| | | | |
|---|---|---|---|
| 3,892,202 | 7/1975 | Feterl | 119/60 |
| 3,995,594 | 12/1976 | Rose | 414/24.5 X |
| 4,002,147 | 1/1977 | Feterl | 414/24.5 |
| 4,237,821 | 12/1980 | Haines | 414/24.5 X |
| 4,302,139 | 11/1981 | Malish | 414/24.5 |
| 4,306,825 | 12/1981 | Yilit | 414/24.5 |
| 4,330,231 | 5/1982 | Brewer | 414/24.5 |
| 4,348,143 | 9/1982 | Hedgespeth | 414/24.5 |
| 4,367,062 | 1/1983 | Duenow | 414/24.5 |
| 4,518,299 | 5/1985 | Vanderlei | 414/24.6 |
| 4,687,402 | 8/1987 | Zatylny | 414/24.6 |
| 4,722,651 | 2/1988 | Antal | 414/24.5 |
| 4,773,806 | 9/1988 | Beaulieu | 414/24.5 |
| 5,062,757 | 11/1991 | Eichenauer | 414/24.5 |
| 5,082,413 | 1/1992 | Grosz | 414/24.5 |
| 5,165,836 | 11/1992 | Shonka | 414/111 |
| 5,249,903 | 10/1993 | Green et al. | 414/24.5 |
| 5,281,068 | 1/1994 | Bruce | 414/24.5 |
| 5,465,559 | 11/1995 | Heiner et al. | 53/567 |
| 5,639,199 | 6/1997 | Connell, Jr. | 414/24.5 |

*Primary Examiner*—Janice L. Krizek
*Attorney, Agent, or Firm*—I. C. Waddey, Jr.; Waddey & Patterson

[57] ABSTRACT

A hay spear is adapted to provide for the transportation and maneuvering of hay bale rings. A hay bale ring is generally placed over round bales of hay left in a feeding area for cows, requiring the cows to put their heads through openings in the ring to reach the hay and, in this manner, preventing cows from trampling and wasting the hay. The hay bales themselves are commonly transported with the use of a tractor fitted with a hydraulic lift and a hay bale spear, for attaching to and moving a bale of hay. In the past, the rings have been moved from bale to bale manually, which is necessarily a dirty job due to the messy nature of such feeding areas. The hay bale ring mover allows for the use of a tractor and hydraulic lift in moving and positioning the ring as well as the hay bale. The hay bale ring mover has attached hooks so that a tractor can be backed up into a ring, with the hooks and the spear passing through the openings in the ring. When the lift is engaged, the hooks grab the ring and lift it, with the curved base of the device supporting the lower portion of the ring. The ring may then be moved to the desired position and lowered over a bale. Alternatively, a ring mover device may be added to an existing hay spear. Thus, the farmer can complete the repositioning of a ring without getting off his tractor.

6 Claims, 5 Drawing Sheets

HAY BALE RING MOVER

BACKGROUND OF THE INVENTION

The present invention relates generally to a farming procedure used to feed cattle. More particularly, this invention pertains to an apparatus that allows a farmer to transport and position a hay bale ring by using a tractor with a hydraulic lift. Commonly, round bales of hay are placed on the ground for cows to feed from. These round hay bales are between 800 and 1500 pounds and, thus, cannot be maneuvered by a single person. Because a farmer cannot load such a heavy bale alone, there exist a number of devices that can be attached to the rear of a vehicle to grab and hold a hay bale while it is moved.

A common type of attachment consists of a spear that can be connected to the hydraulic lift of a tractor. The tractor is then backed into the hay bale so that the spear is inserted into the bale. The bale is raised by means of a hydraulic lift and moved to the desired location. A hay bale ring is then placed over the bale of hay. The ring consists of two opposing circular bands with distantly spaced slats extending between the bands. The ring forces the cows to put their head and necks through the openings in the ring in order to feed from the hay bale, preventing the cows from tromping the hay and wasting food. While a tractor is used to transport the hay bale to the desired location, the current practice is for a farmer to manually transport and place the ring around the hay bale. There are several reasons why this is not desirable. As might be expected, when cows feed from a bale of hay, they tend to destroy the sod around the area, muddying up the ground and leaving large quantities of cow manure around the ring. Once a bale of hay has been exhausted, the farmer is forced to walk through this area to get the ring so that it can be placed around a new bale of hay. Generally, a new bale would be placed in a different location to allow the grass to grow back in the spot previously covered by the exhausted hay bale. So, in the process of retrieving the ring and moving it to a new location, a farmer may become quite dirty.

There are numerous devices to facilitate the transportation of round hay bales, including various types of arms to grip and raise a hay bale, either attached directly to a tractor or truck or as part of a trailer to be attached to a vehicle. Samples of such devices are seen in U.S. Pat. Nos. 4,306,825, 4,367,062 and 4,773,806. However, these devices are not suited for the picking up and positioning of hay bale rings.

What is needed, then, is a way to move the ring from the site of an exhausted hay bale to the site of a new bale, and place the ring over the bale without the farmer having to walk through the mess left by the cows at a past eating spot. As the farmer already uses a tractor to transport the hay bales, it is desirable to be able to use the tractor in a similar fashion to transport and place the ring.

SUMMARY OF THE INVENTION

The present invention is directed to a hay bale ring mover that provides for the use of a tractor to facilitate the transportation and positioning of a ring around a round hay bale. The present invention is designed so that the device can be attached to a three-point hitch on a tractor. The device incorporates a hay spear so that the same device may be used for the transportation of round hay bales as well as hay bale rings. An alternate embodiment is envisioned that includes a ring mover device for use in conjunction with an existing hay spear device.

The hay bale ring mover includes vertical posts on either side of the bale spear, hooks on the top of the posts, and an arcuate section at the bottom of the structure. The device is mounted on the back of the tractor in the same manner that existing hay spear devices are mounted, allowing the tractor to be backed up to the ring with the spear and hooks passing between the slats in the ring. The lift is then raised so that the hooks catch underneath the band that surrounds the top of the ring and the arcuate section of the device cradles the lower portion of the ring while the tractor is driven to the new feeding location. The lift can be raised so that the ring is raised above the bale of hay and placed over it. The ring may then be lowered into position over the fresh bale by lowering the lift of the tractor. Thus, the farmer can reposition a ring without getting off the tractor.

It is an object of the present invention to provide a hay bale ring mover that allows for the transportation of both round hay bales and hay bale rings.

It is a further object of the invention to provide a ring mover that can be attached to and utilized with an existing hay spear mover.

It is yet another object of the present invention to provide a way to transport and position a ring around a bale of hay that does not require a farmer to get off his tractor.

DESCRIPTION OF THE PREFERRED EMBODIMENTS

Figure 1:
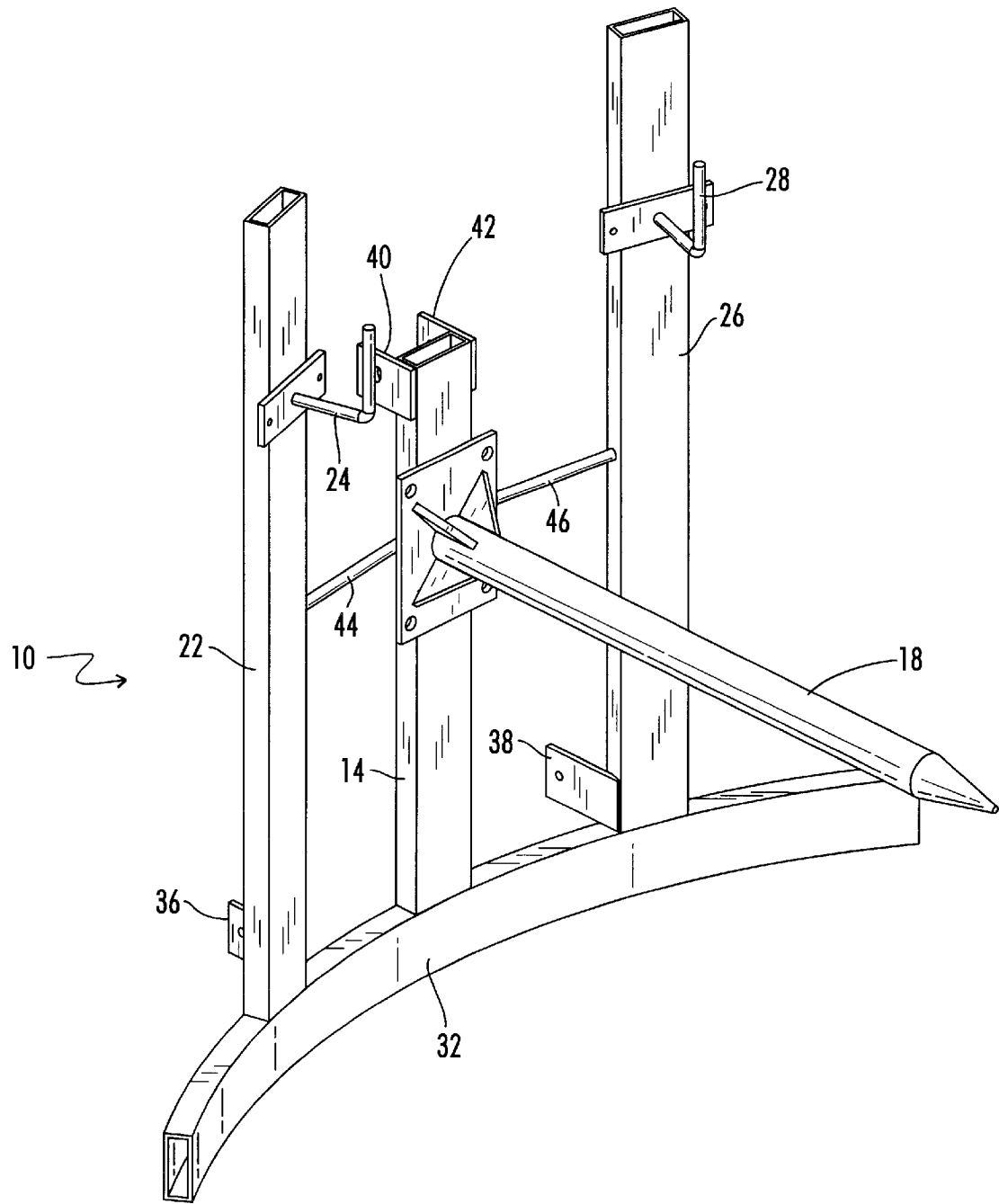
FIG. 1 is a perspective view of the present invention incorporating the ring mover and the hay bale spear in one unit.

With reference to FIG. 1, the hay bale ring mover, designated generally as 10, is shown. The hay bale ring mover 10 is comprised of a horizontal arcuate base 32 to which three vertical posts 14, 22 and 26 are attached. The posts 22 and 26 are aligned in complementary positions on either side of the center post 14, spaced such that posts 22 and 26 are at a distance which corresponds to the distance between the two lower connection points of a three-point hitch on a tractor. The center post 14 is situated at the horizontal midpoint of posts 22 and 26. There are two lugs 40 and 42 attached to center post 14 which are positioned to couple to the upper connection point of a three-point hitch.

The bale spear 18 is perpendicularly attached to the center post 14 in a direction away from the tractor, at a point approximately equal to the vertical midpoint of the posts 22 and 26. At the point where posts 22 and 26 join with the arcuate base 32 there are lugs 36 and 38, which provide a means for attaching the ring mover 10 to the two lower connection points of a three-point hitch on a tractor. Horizontal braces 44 and 46 extend from the center post 14 to posts 22 and 26, respectively, to provide additional stability to the structure.

Located at the upper end of post 22, rearwardly facing away from the tractor, is a hook 24. The hook 24 is L shaped and extends in a direction away from the post 22, then curving in a direction perpendicular to and away from the base 32. Hook 28 is similarly situated on post 26. When the ring mover 10 is mounted on a tractor, the tractor may be backed up to a ring such that the spear 18 passes between the slats in the ring. The hydraulic lift of the tractor is then raised in a manner causing the hooks 26 and 28 to catch underneath the top band of the ring. The base 32, arched to conform to the curvature of the ring, cradles the lower portion of the ring as it is lifted. The tractor may then be driven to the new feeding location, at which point the lift is lowered, easing the ring into position over a new hay bale.

Figure 2:
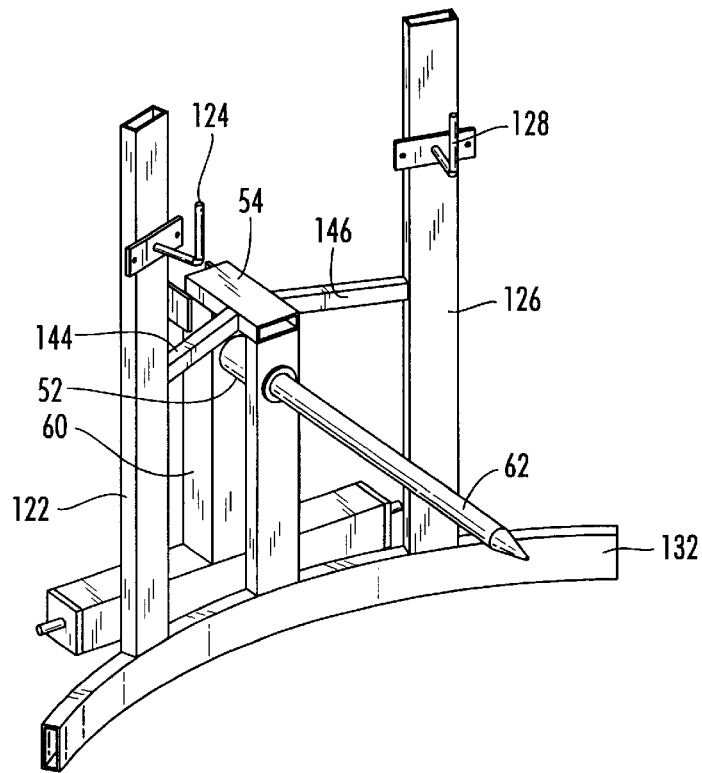
FIG. 2 is a perspective view of the present invention as assembled with an existing hay bale spear.
Figure 3:
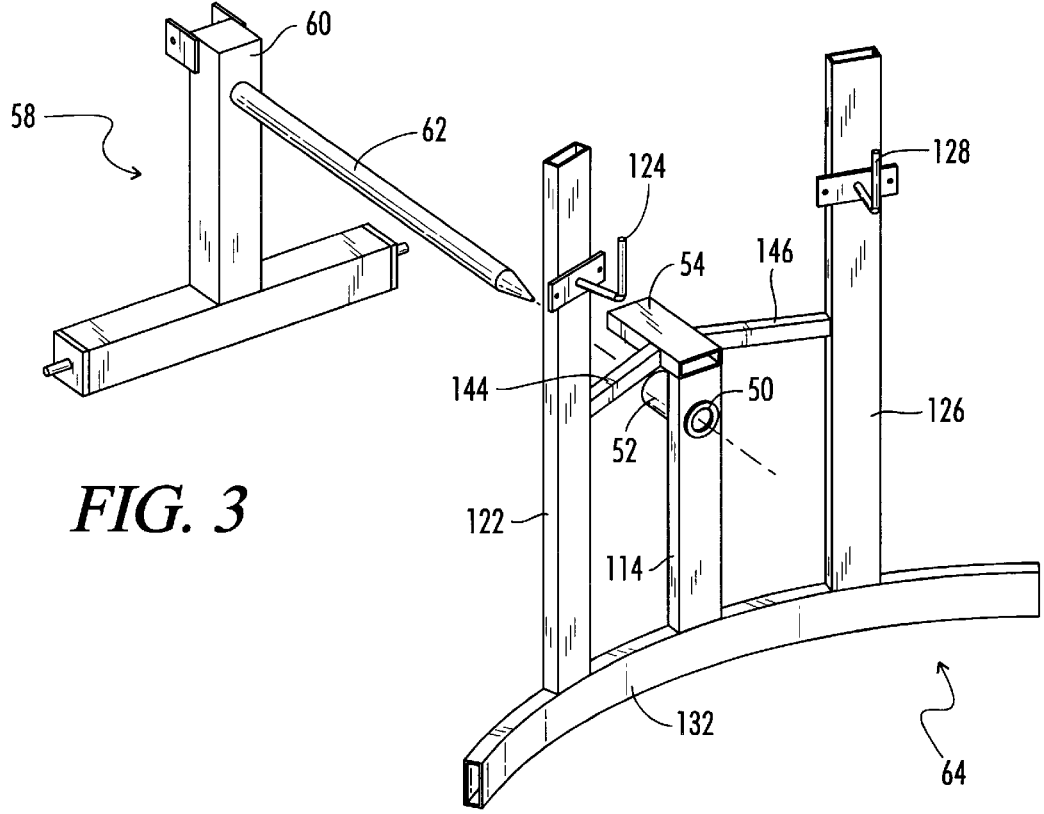
FIG. 3 is a perspective view of the present invention before assembled with an existing spear.
Figure 4:
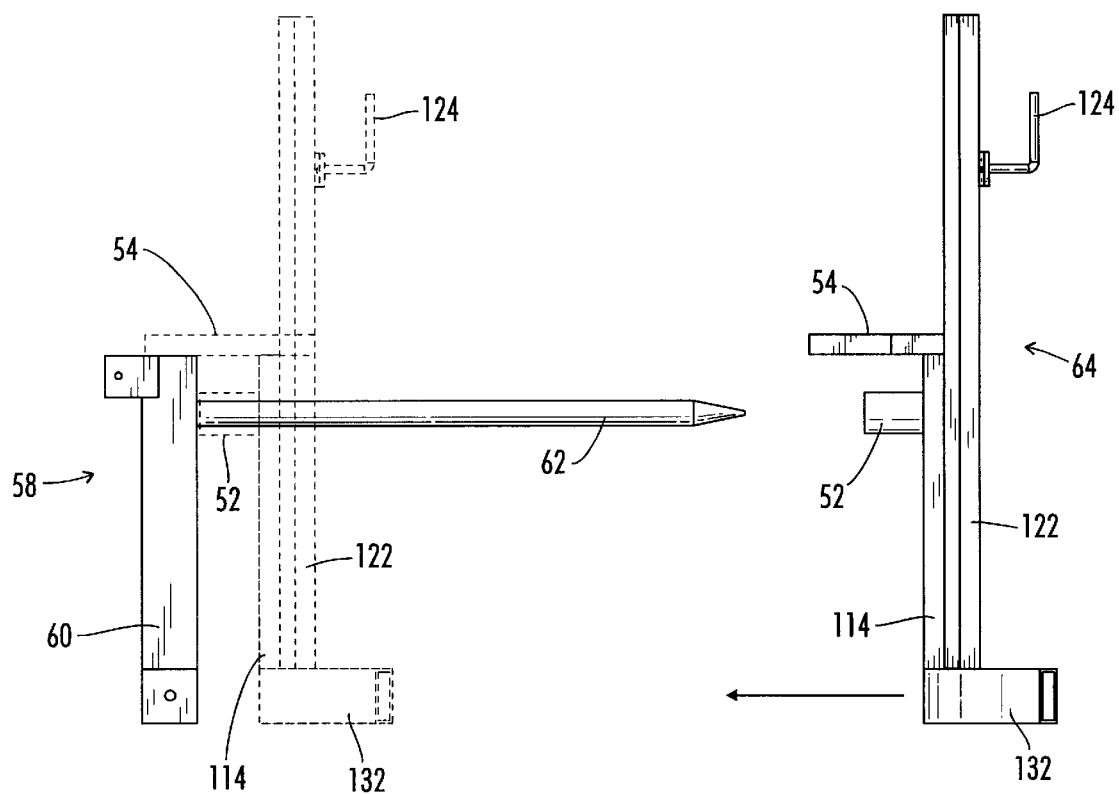
FIG. 4 is a side view of the present invention illustrating how the ring mover is attached to an existing spear.

With respect to FIGS. 2–4, an alternate embodiment of the present invention is shown, wherein the ring mover is an accessory that can be added to an existing hay spear device 58. FIG. 3 illustrates the ring mover attachment 64 before it is joined with the hay spear device 58. Like the embodiment shown in FIG. 1, the ring mover attachment 64 has three posts 114, 122 and 126, attached to a horizontal arcuate base 132. Outer posts 122 and 126 have hooks 124 and 128. Horizontal braces 144 and 146 extend from the center post 114 to posts 122 and 126 respectively.

As seen in FIG. 3, the center post 114 has a hole 50 through it with a hollow cylindrical pipe 52 extending in the direction of the tractor. The hole 50 serves as a guide to allow the spear 62 of a separate hay spear device 58 to be inserted through the ring mover attachment 64 thus joining the two. In this manner, the hay spear device 58, which is designed such that it can be attached to the hydraulic lift of a tractor, is fitted with the ring mover attachment 64 enabling the resulting hay bale ring mover to transport both hay bales and rings.

As can be seen from FIG. 4, in order to prevent the ring mover attachment 64 from spinning about the circumference of the spear 62, a rectangular bar 54 is positioned on top of the center post 114, with the length of the bar 54 extending out past the center post 114 in the direction of the tractor. When the ring mover attachment 64 is mounted on the spear 62, the bar 54 fits on the top of the post 60 on which the spear 62 is mounted, preventing the occurrence of a spinning effect that might otherwise result.

Figure 5A:
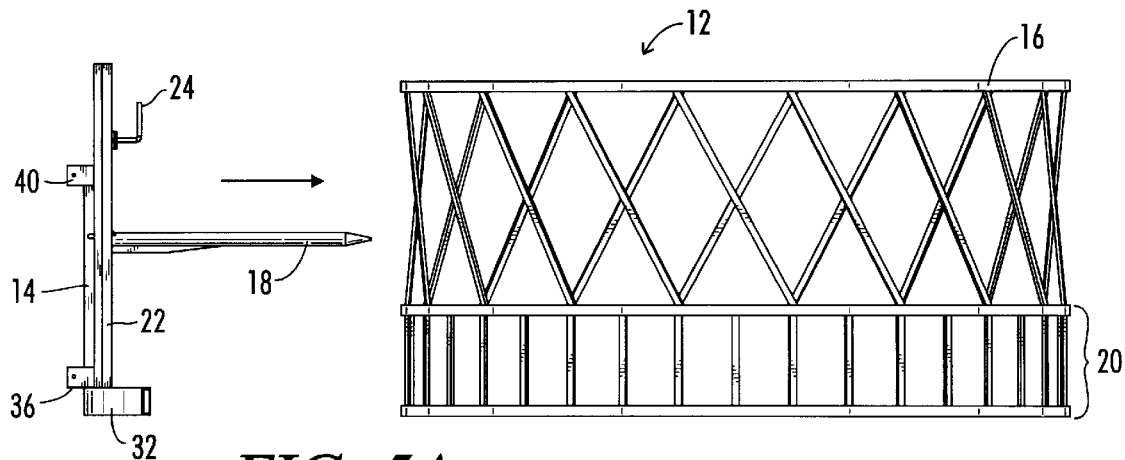
FIG. 5A is a side view of the present invention in an exploded relationship to a hay bale ring.
Figure 5B:
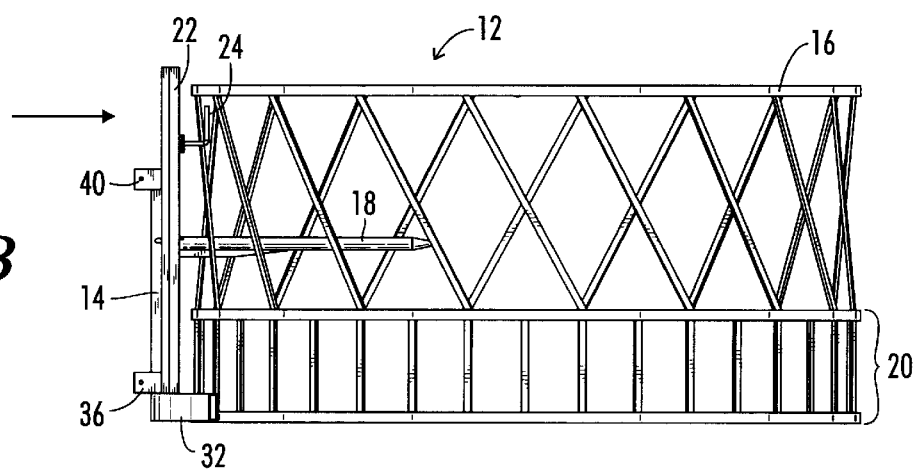
FIG. 5B is a side view of the present invention where the invention has been backed up into a hay bale ring.
Figure 5C:
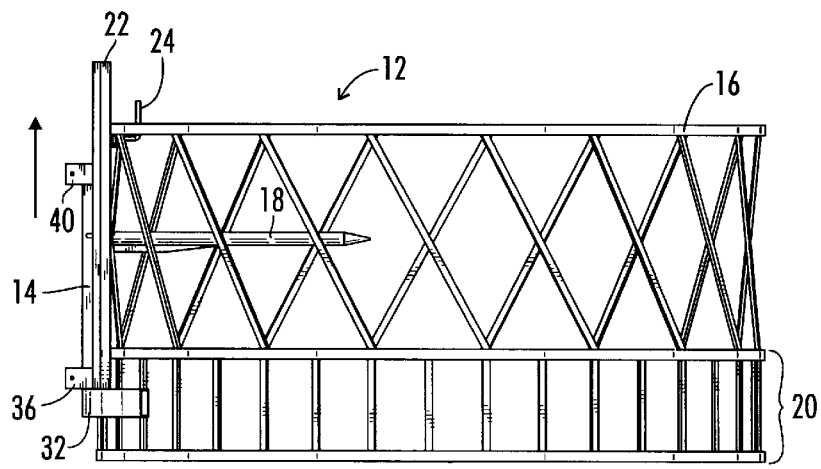
FIG. 5C is a side view of the present invention where the invention has been backed up into a hay bale ring and lifted in an upward direction so that the hooks have caught the upper band of the ring.
Figure 6:
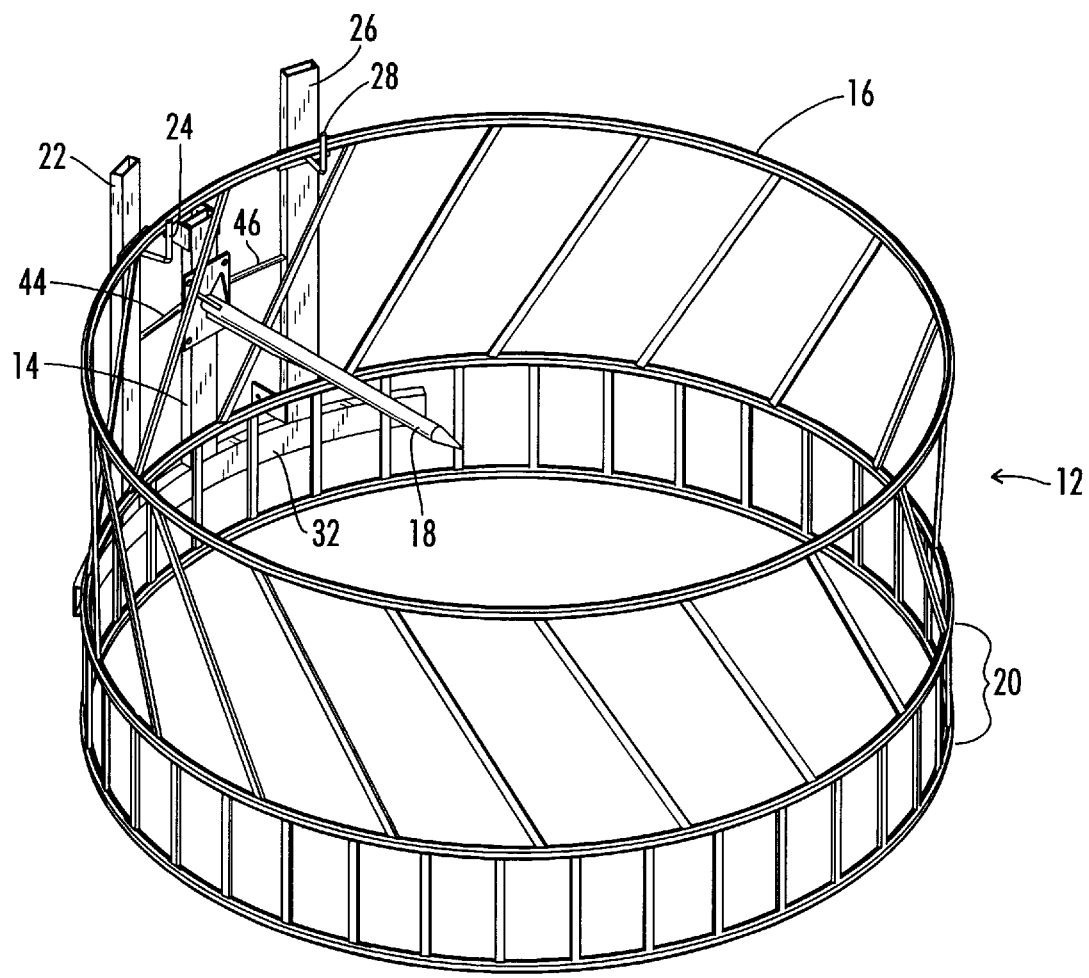
FIG. 6 is a perspective view of the present invention where the invention has joined with a hay bale ring.

FIGS. 5A–5C illustrate the manner in which the present invention is utilized, in both the one piece unit embodiment, as well as the embodiment wherein a hay bale ring mover is an accessory to a hay spear device. The device is backed up into the ring 12 so that the spear 18 and the hooks 24 and 28 pass through the ring 12. As the hydraulic lift is raised, the hooks 24 and 28 catch underneath the top band 16 of the ring 12, and the base 32 cradles the lower portion 20 of the ring 12. The ring 12 is lifted up and transported to the desired location, with the hooks 24 and 28 and base 32 supporting the ring 12. The hydraulic lift may then lower the ring 12 into the desired position, with the hooks 24 and 28 disengaging as the ring 12 is placed on the ground and the lift continues to lower the hay bale ring mover so that the hooks 24 and 28 are lower than the top band 16 of the ring 12. The tractor may then move forward, completely separating from the hay bale ring 12. FIG. 6 illustrates how spear 18 and hooks 24 and 28 pass through and engage ring 12.

Although there have been described particular embodiments of the present invention of a new and useful Hay Bale Ring Mover, it is not intended that such references be construed as limitations upon the scope of this invention except as set forth in the following claims.

What is claimed is:

1. A hay bale ring mover including:

an elongated base member for supporting a hay bale ring;

at least one elongated post extending substantially perpendicularly from said base member;

at least one hook located on said at least one elongated post for engaging a hay bale ring to be lifted and transported; and a guide for removably connecting said ring mover to a hay spear by sliding the hay spear through said guide.

2. The hay bale ring mover of claim 1, wherein said guide is a hole in an elongated post.

3. The hay bale ring mover of claim 2, further including:

a pipe mounted to said elongated post at the point of said hole to provide additional support for said hay bale ring mover.

4. The hay bale ring mover of claim 1, wherein said elongated base member is arcuate.

5. The hay bale ring mover of claim 1, further including:

lugs for connecting said hay spear to the hydraulic lift of a tractor.

6. A hay bale ring mover including:

an elongated base member for supporting a hay bale ring;

a plurality of elongated posts extending perpendicularly from said base member;

a plurality of hooks located on said plurality of elongated posts for engaging a hay bale ring to be lifted and transported; and a bar extending from said base member to engage a hay spear on which the hay bale ring mover is designed to be mounted, thereby stabilizing said hay bale ring mover when mounted on said hay spear.

* * * * *